(12) United States Patent
Bozek et al.

(10) Patent No.: US 10,781,719 B2
(45) Date of Patent: Sep. 22, 2020

(54) TURBOCHARGER

(71) Applicant: MAN Energy Solutions SE, Augsburg (DE)

(72) Inventors: Lukás Bozek, Pribyslavice (CZ); Petr Holik, Velká Biteš (CZ)

(73) Assignee: MAN Energy Solutions SE, Augsburg (DE)

( * ) Notice: Subject to any disclaimer, the term of this patent is extended or adjusted under 35 U.S.C. 154(b) by 43 days.

(21) Appl. No.: 16/117,887

(22) Filed: Aug. 30, 2018

(65) Prior Publication Data
US 2019/0071999 A1 Mar. 7, 2019

(30) Foreign Application Priority Data
Sep. 5, 2017 (DE) .................. 10 2017 120 338

(51) Int. Cl.
*F16C 35/00* (2006.01)
*F01D 25/18* (2006.01)
(Continued)

(52) U.S. Cl.
CPC .......... *F01D 25/183* (2013.01); *F01D 25/162* (2013.01); *F01D 25/24* (2013.01);
(Continued)

(58) Field of Classification Search
CPC ...... F01D 25/183; F01D 25/24; F01D 25/162; F01D 25/14; F01D 25/18; F01D 25/16; F16C 35/00; F16C 33/72; F02B 39/14; F02B 33/40; F05D 2260/98; F05D 2240/55; F05D 2220/40; F02C 6/12
See application file for complete search history.

(56) References Cited

U.S. PATENT DOCUMENTS 3,778,194 A * 12/1973 Miller .................. F01D 25/186
 417/407
4,009,972 A * 3/1977 Sarle .................... F01D 25/186
 417/407

(Continued)

FOREIGN PATENT DOCUMENTS

DE         19523259 A1 * 8/1996 ............. F01D 11/06
DE    102017120338 A1 * 3/2019 ............. F01D 25/24
(Continued)

*Primary Examiner* — Moshe Wilensky
*Assistant Examiner* — Brian Christopher Delrue
(74) *Attorney, Agent, or Firm* — Cozen O'Connor

(57) ABSTRACT

A turbocharger, with a turbine for expanding a first medium that includes a turbine rotor and a turbine housing, a compressor for compressing a second medium that includes a compressor rotor coupled to the turbine rotor via a shaft and a compressor housing, a bearing housing in which the shaft is mounted, a bearing housing cap delimiting the bearing housing facing the turbine, and a turbine cover delimiting the turbine on a side facing the bearing housing and has a section projecting into a recess of the bearing housing cap. On a section of the bearing housing cap delimiting the recess of the bearing housing cap on the outside, which on the outside follows the section of the turbine cover projecting into the recess of the bearing housing cap, an oil trapping lip is formed on a side of the bearing housing cap facing the turbine rotor.

8 Claims, 5 Drawing Sheets

(51) Int. Cl.
  *F01D 25/16* (2006.01)
  *F01D 25/24* (2006.01)
  *F02B 33/40* (2006.01)
  *F02B 39/14* (2006.01)
  *F16C 33/72* (2006.01)

(52) U.S. Cl.
  CPC ............. *F02B 33/40* (2013.01); *F02B 39/14* (2013.01); *F16C 33/72* (2013.01); *F16C 35/00* (2013.01); *F05D 2220/40* (2013.01); *F05D 2240/55* (2013.01); *F05D 2260/98* (2013.01)

(56) References Cited

U.S. PATENT DOCUMENTS

| | | | | |
|---|---|---|---|---|
| 4,107,927 | A * | 8/1978 | Gordon, Jr. | F01D 25/125 60/605.1 |
| 4,142,608 | A * | 3/1979 | Sarle | F01D 25/186 184/6.11 |
| 4,179,247 | A * | 12/1979 | Osborn | F01D 17/165 384/518 |
| RE30,333 | E * | 7/1980 | Gordon, Jr. | F01D 25/125 415/175 |
| 4,235,484 | A * | 11/1980 | Owen | F01D 25/166 384/398 |
| 4,389,052 | A * | 6/1983 | Shimizu | F16C 33/1025 277/346 |
| 4,392,752 | A * | 7/1983 | Shimizu | F01D 11/00 384/135 |
| 4,482,303 | A * | 11/1984 | Acosta | F01D 25/16 384/121 |
| 4,586,878 | A * | 5/1986 | Witchger | F02C 6/12 415/166 |
| 5,028,208 | A * | 7/1991 | Mitsubori | F01D 17/165 415/150 |
| 6,126,414 | A * | 10/2000 | Koike | F01D 25/168 417/407 |
| 8,001,781 | B2 * | 8/2011 | Shibui | F02B 37/10 417/374 |
| 8,348,595 | B2 * | 1/2013 | Koch | F01D 25/16 415/104 |
| 10,280,832 | B2 * | 5/2019 | Babak | F02B 37/00 |
| 2002/0158418 | A1 * | 10/2002 | Thiesemann | F01D 25/18 277/423 |
| 2010/0124496 | A1 * | 5/2010 | French | F01D 25/162 415/229 |
| 2010/0139270 | A1 * | 6/2010 | Koch | F01D 25/16 60/605.3 |
| 2012/0237149 | A1 * | 9/2012 | Uesugi | F01D 25/166 384/397 |
| 2013/0011276 | A1 * | 1/2013 | Patel | F01D 11/003 417/53 |
| 2018/0274435 | A1 * | 9/2018 | Babak | F02B 37/00 |

FOREIGN PATENT DOCUMENTS

| | | | | |
|---|---|---|---|---|
| WO | WO 1987006981 A3 * | 11/1987 | ............ | F04D 29/28 |
| WO | WO-2008042698 A1 * | 4/2008 | ............ | F01D 25/18 |
| WO | WO-2009125452 A1 * | 10/2009 | ............ | F01D 25/186 |

\* cited by examiner

Prior art Fig. 3

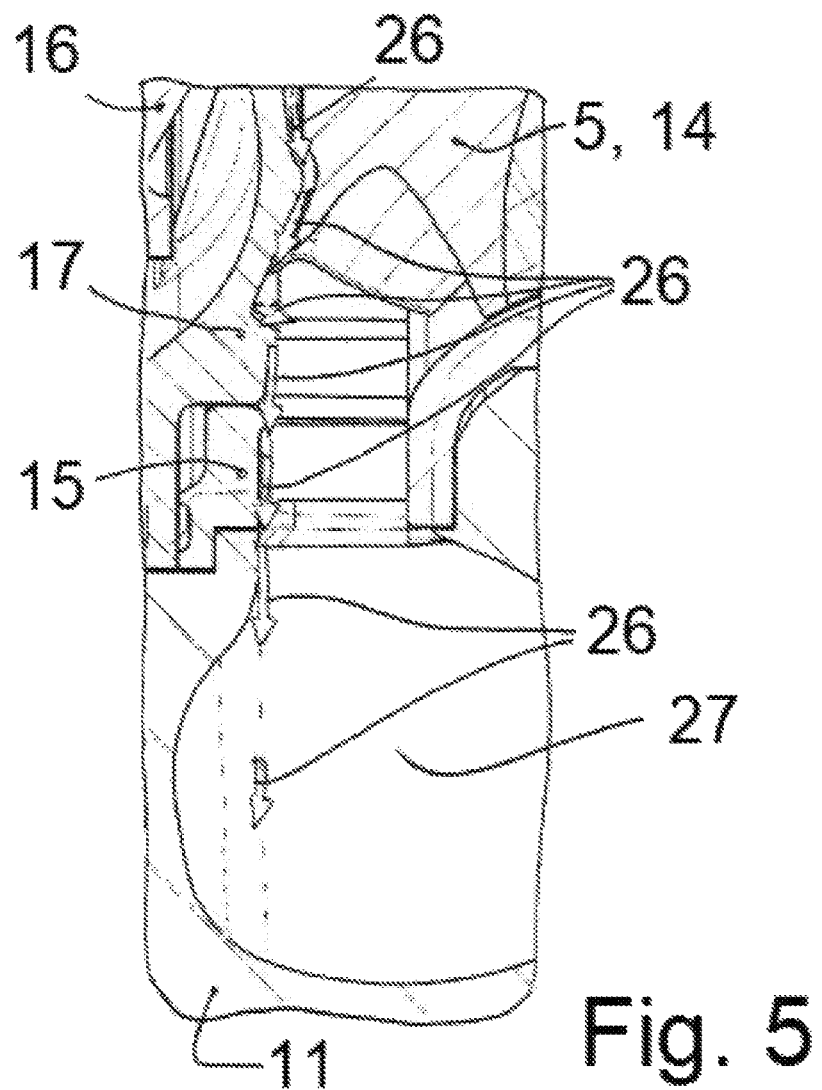

TURBOCHARGER

BACKGROUND OF THE INVENTION

1. Field of the Invention

The invention relates to a turbocharger.

2. Description of the Related Art

FIG. 1 shows the fundamental construction of a turbocharger 1 known from the prior art. The turbocharger 1 comprises a turbine 2 for expanding a first medium, in particular for expanding exhaust gas of an internal combustion engine. Furthermore, a turbocharger 1 comprises a compressor 3 for compressing a second medium, in particular charge air, namely utilising energy extracted in the turbine 2 during the expansion of the first medium.

The turbine 2 comprises a turbine housing 4 and a turbine rotor 5. The compressor 3 comprises a compressor housing 6 and a compressor rotor 7. The compressor rotor 7 is coupled to the turbine rotor 5 via a shaft 8, which is mounted in a bearing housing 9, wherein the bearing housing 9 is positioned between the turbine housing 4 and the compressor housing 5 and is connected to both the turbine housing 4 and the compressor housing 5. FIG. 1, furthermore, shows a silencer 10 on the compressor side.

The turbine housing 4 of the turbine 2 comprises an inflow housing 11 and an outflow housing 12. By way of the inflow housing 11, the first medium to be expanded in the region of the turbine 2 can be supplied to the turbine rotor 5. By way of the outflow housing 12, a first medium expanded in the region of the turbine rotor 5 flows away from the turbine 2.

In addition to the inflow housing 11 and the outflow housing 12, the housing 4 comprises an insert piece 13, wherein the insert piece 13 extends in particular in the region of the inflow housing 11, namely adjacent to the turbine rotor 5 adjoining moving blades 14 of the turbine rotor 5 radially outside.

Furthermore, the turbine housing 4 comprises a nozzle ring 15. The nozzle ring 15 is also called turbine guide apparatus.

FIG. 1, furthermore, shows a bearing housing cap 16 and a turbine cover 17 in the connecting region of inflow housing 11 and bearing housing 9.

FIGS. 2 and 3 show further details of a turbocharger known from the prior art in the region of the bearing cap 16 and the turbine cover 17. The bearing housing cap 16 axially delimits the bearing housing 9 and the turbine cover 17 axially delimits the turbine 2, and the turbine cover 17, follows the bearing housing cap 16 in the axial direction. From FIG. 2 it is evident that the turbine cover 17 radially outside and at the top, projects with a section 17a into a recess 16a of the bearing housing cap 16, wherein the section 17a of the turbine cover 17 is followed radially outside by a section 16b of the bearing housing cap 16, which delimits the recess 16a of the bearing housing cap 16 radially outside.

During the operation of the turbocharger, oil can leak from the bearing housing 9, namely via a sealing gap 18 formed between the bearing housing cap 16, namely the section 16b of the bearing housing cap 16, and the bearing housing 9. This sealing gap 18 is sealed via a sealing element 19. Despite this, oil can leak via this sealing gap 18 from the bearing housing 9 in the direction of the turbine 2 as is shown by the arrow 20 of FIG. 2.

With turbochargers known from the prior art, this oil, which according to the arrow 20 flows via the sealing gap 18 between bearing housing cap 16 and bearing housing 9, initially flows in the direction of the arrows 21 along the bearing housing cap 16 and subsequently enters a gap between the bearing housing cap 16 and turbine cover 17 and according to FIG. 3 then flows downward via the gap between the bearing housing cap 16 and the turbine cover 17 and can finally enter the surroundings. This is disadvantageous.

SUMMARY OF THE INVENTION

One aspect of the invention is a new type of turbocharger.

According to one aspect of the invention, an oil trapping lip is formed on the section of the bearing housing cap delimiting the recess of the bearing housing cap on the outside, which on the outside follows the section of the turbine cover projecting into the recess of the bearing housing cap, on a side of the bearing housing cap facing the turbine rotor.

The oil trapping lip traps oil, which flows via the sealing gap between bearing housing cap and bearing housing in the direction of the turbine and prevents the oil from entering a gap between bearing housing cap and turbine cover. Oil is kept on the side of the turbine cover facing the turbine rotor and guided into a turbine flow duct where it is combusted. The danger that oil enters the surroundings of the turbocharger is reduced.

Preferentially, the oil trapping lip is formed by a protrusion and a groove, wherein the protrusion of the oil trapping lip has a smaller clearance from the turbine rotor than the groove of the oil trapping lip. This configuration of the oil trapping lip makes possible a particularly effective trapping of the oil.

Preferentially, the protrusion of the oil trapping lip extends starting out from the section of the bearing housing cap to radially inside with an oblique position relative to the radial direction in the direction of the turbine rotor. The groove of the oil trapping lip is opened to radially inside and faces the section of the turbine cover projecting into the recess of the bearing housing cap. This makes possible a particularly effective trapping of the oil.

According to an advantageous further development of the invention, an oil trapping slope is formed on the section of the turbine cover projecting into the recess of the bearing housing cap on the side of the turbine cover facing the turbine rotor. The oil trapping lip of the bearing housing cap conducts oil onto the oil trapping slope of the turbine cover, wherein the oil trapping slope of the turbine cover conducts the oil into a turbine flow duct. The oil trapping slope on the turbine cover supports the effect of the oil trapping lip. The oil trapping slope also prevents that oil enters the gap between bearing housing cap and turbine cover and can thus escape into the surroundings via this gap. Oil is kept on the side of the turbine cover facing the turbine rotor, guided into a turbine flow duct where it is combusted.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this. It shows:

FIG. 5 is a further detail of a turbocharger.

DETAILED DESCRIPTION OF THE PRESENTLY PREFERRED EMBODIMENTS

Figure 1:
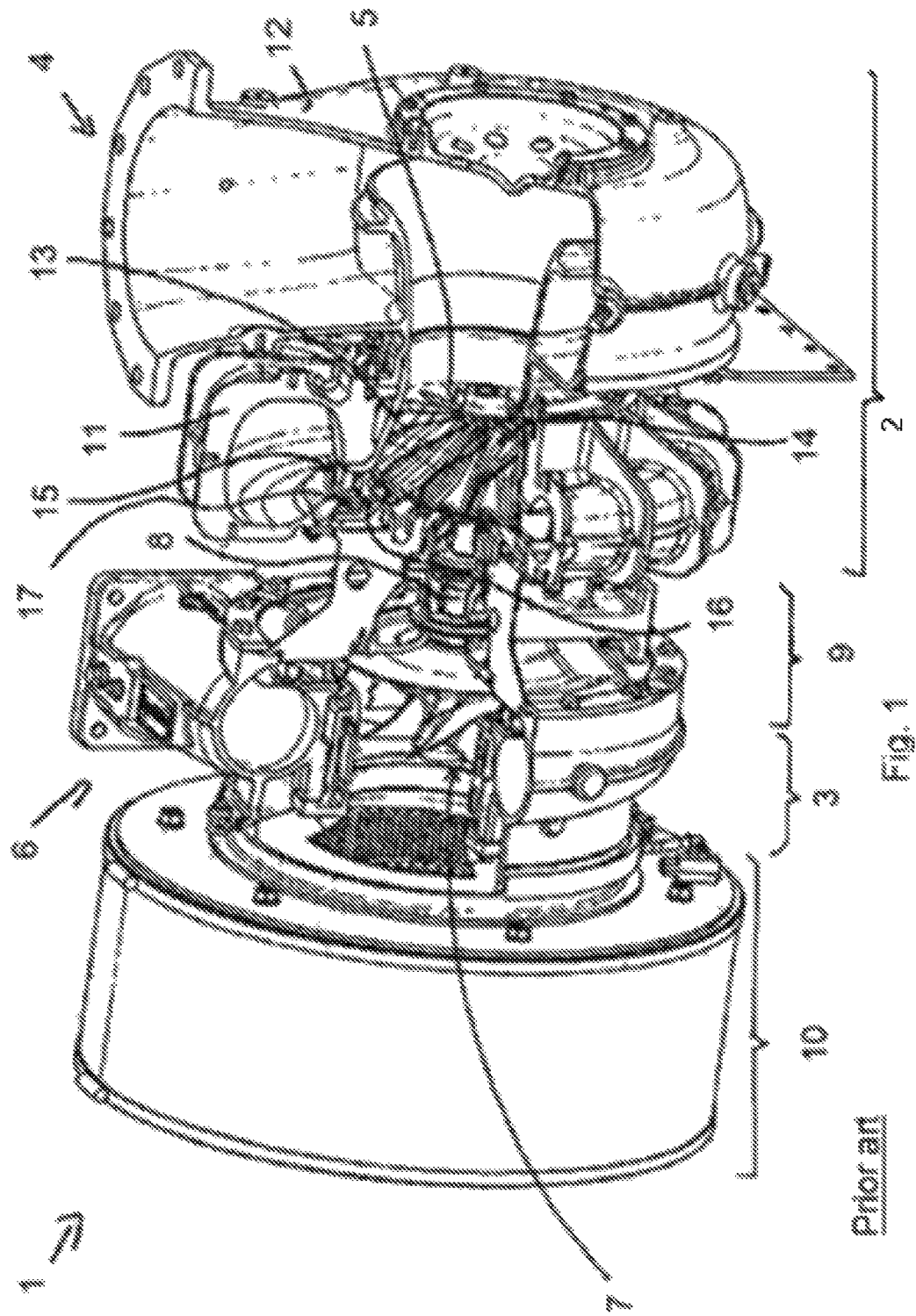
FIG. 1 is a cross section through a turbocharger.

The invention present here relates to a turbocharger. The fundamental construction of a turbocharger according to the prior art and the problems of such turbochargers known from the prior art were already described with reference to FIGS. 1, 2 and 3. In the following, only details of a turbocharger according to the invention are discussed, namely making reference to FIGS. 4 and 5.

Figure 2:
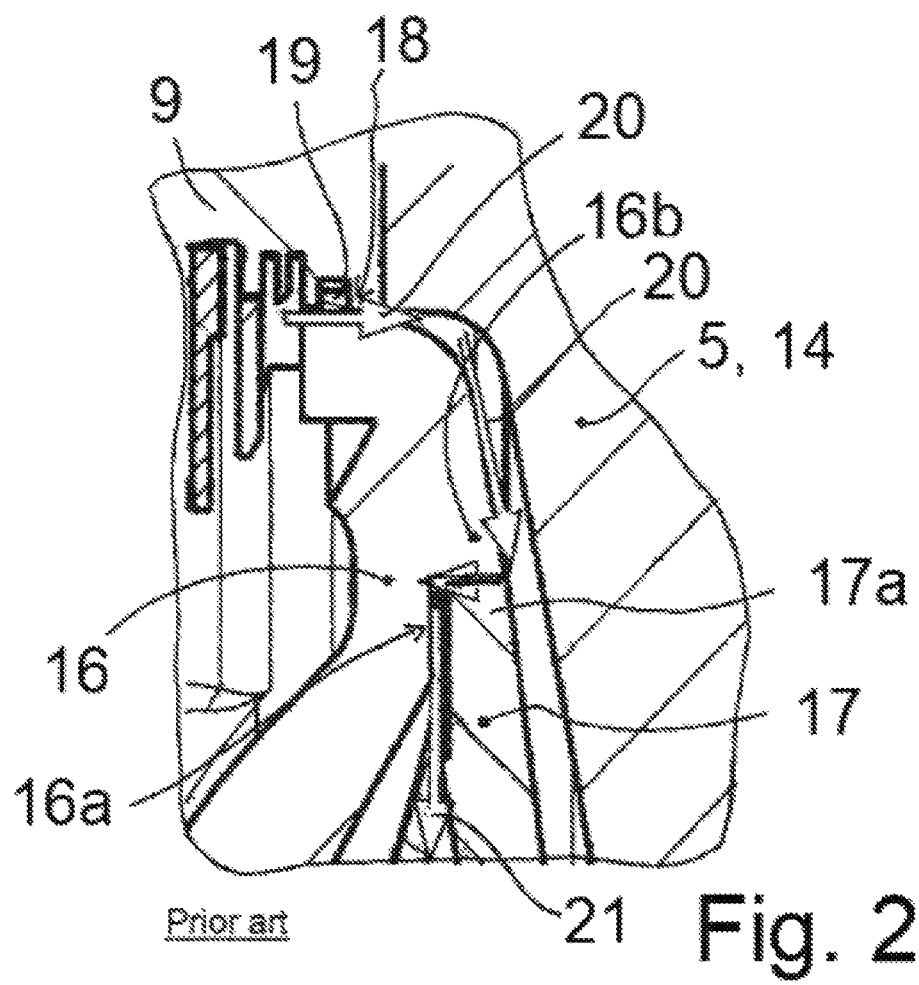
FIG. 2 is a detail of a turbocharger according to the prior art.
Figure 3:
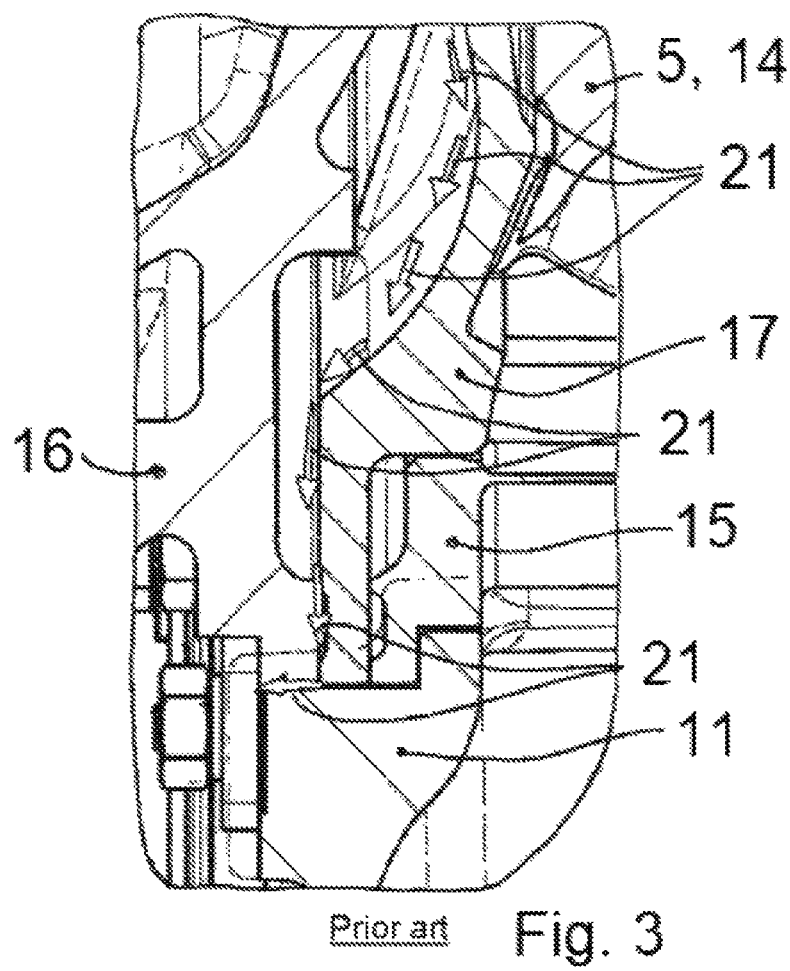
FIG. 3 is a further detail of a turbocharger according to the prior art.
Figure 4:
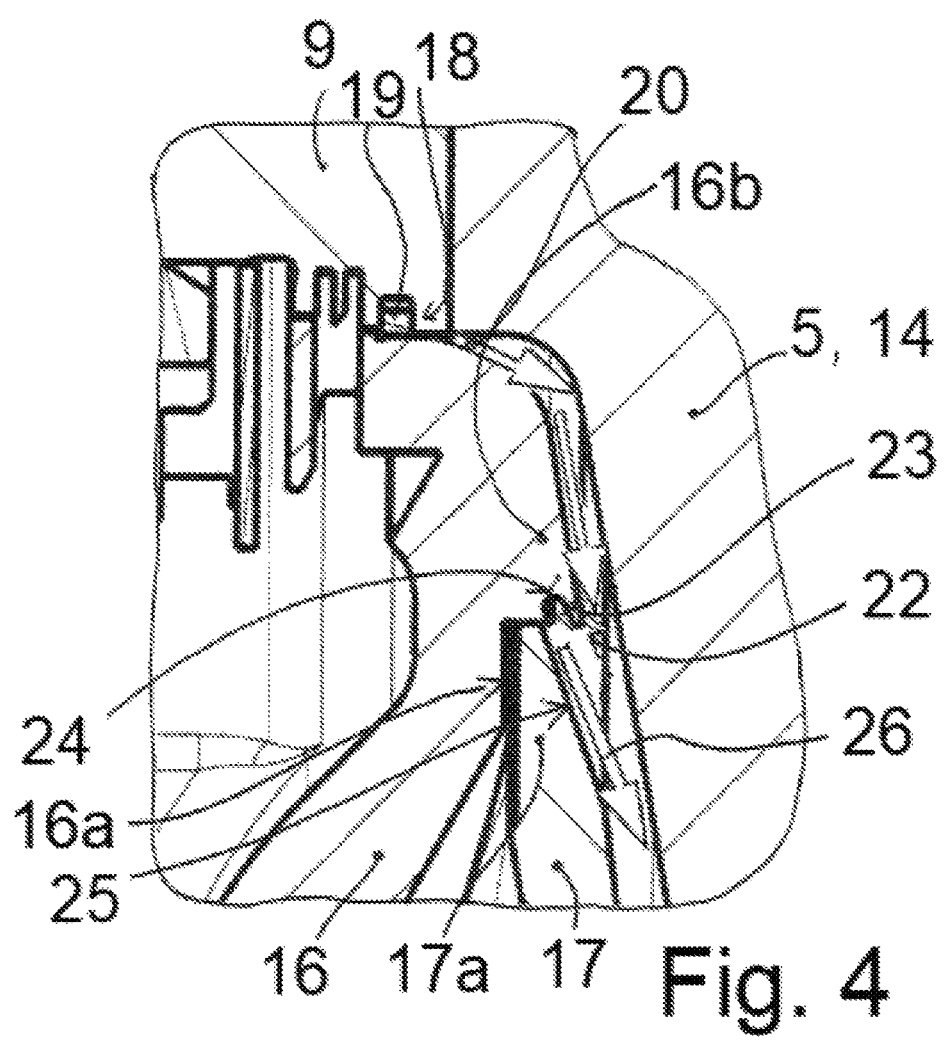
FIG. 4 is a detail of a turbocharger.

FIGS. 4 and 5 show details of a turbocharger according to one aspect of the invention, namely sections which with respect to their positioning, correspond to the details of FIGS. 2 and 3. Accordingly, FIG. 4 shows in particular a bearing housing cap 16 and a turbine cover 17, wherein the bearing housing cap 16 axially delimits the bearing housing 9 and the turbine cover 17 axially delimits the turbine 2. A radially outer, upper section 17a of the turbine cover 17 projects into a recess 16a of the bearing housing cap 16, wherein this recess 16a is delimited radially outside by a section 16b of the bearing housing cap 16, which forms the sealing gap 18 with the bearing housing 9. In the turbocharger according to the invention it is provided that on the section 16b of the bearing housing cap 16 delimiting the recess 16a of the bearing housing cap 16 on the outside, which follows the section 17b of the turbine cover 17 projecting into the recess 16a on the outside, an oil trapping lip 22 is formed, namely on the side of the bearing cap 16 facing the turbine rotor 5 or the moving blades 14 of the turbine rotor 5.

According to FIG. 4, this oil trapping lip 22 is formed by a protrusion 23 and a groove 24, wherein the protrusion 23 has a smaller clearance 5 from the moving blades 14 of the turbine rotor 5 than the groove 24.

The protrusion 23 of the oil trapping lip 22 extends, starting out from the section 16 of the bearing housing cap 16, to radially inside, obliquely positioned relative to the radial direction in the direction of the turbine rotor 5. The groove 24 of the oil trapping lip 22 is open to radially inside and faces the section 17a of the turbine cover 17, which projects into the recess 16a of the bearing housing cap 16.

Oil, which flows through the sealing gap 18 between the bearing housing 9 and the bearing housing cap 16 according to the arrow 20 in the direction of the turbine rotor 5, reaches the oil trapping lip 22 and is trapped on the same, namely both in the region of the protrusion 23 and also in the region of the groove 24. Because of this it can be avoided that the oil enters a cap between the bearing housing cap 16 and the turbine cover 17.

In a further development of the invention it is provided that on the section 17a of the turbine cover 17 projecting into the recess 16a of the bearing housing cap 16 an oil trapping slope 25 is formed on the side of the turbine rotor 5 or the moving blades 14 facing the same, wherein the oil trapping lip 24 directs oil, which is trapped on the oil trapping lip, onto the oil trapping slope 25. Then, the oil trapping slope 25 guides the oil according to the arrows 26 along the side of the turbine cover 17 facing the turbine rotor 5 and conducts the same into a turbine flow duct 27 of the turbine or of the inflow housing 11 of the turbine housing 4 of the turbine 2. Here, the oil is combusted so that there is no risk that the same escapes into the surroundings.

According to FIG. 4, the oil trapping lip 22 protrudes over the oil trapping slope 25 radially outside at least in sections, namely with clearance in the radial direction. The oil trapping slope 25 is bevelled in such a manner that seen in the axial direction an outer tip of the section 17a of the turbine cover 17 covers neither the protrusion 22 nor the groove 24 of the oil trapping lip 22.

Oil trapped on the oil trapping lip 22 can reach the oil trapping slope 25 without obstruction and can be guided by the oil trapping slope 25 according to the arrows 26 in the direction of the turbine flow duct 27.

Seen in the axial direction, the radially outer tip of the section 17a of the turbine cover 17 has a larger clearance from the turbine rotor 5 or the moving blades 14 of the same than the sealing lip 22, namely than the protrusion 23 and the groove 24 of the oil trapping lip 22.

With the invention, oil, which escapes from the bearing housing 9 via the sealing gap 18 between sealing cover 16 and bearing housing 9, can be safely discharged into the turbine flow duct 27 of the inflow housing 11 of the turbine housing 4 and combusted there. The risk that such oil enters the surroundings via a gap between bearing housing cap 16 and turbine cover 17 is minimised.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. A turbocharger, comprising:
a shaft;
a turbine configured to expand a first medium, and having:
    a turbine rotor; and
    a turbine housing;
a compressor configured to compress a second medium utilizing energy extracted in the turbine during expansion of the first medium, and having:

a compressor rotor coupled to the turbine rotor via the shaft; and
a compressor housing;
a bearing housing, in which the shaft is mounted;
a bearing housing cap delimiting the bearing housing on a side facing the turbine;
a turbine cover delimiting the turbine on a side facing the bearing housing, which follows the bearing housing cap and which has a section that projects into a recess of the bearing housing cap; and
an oil trapping lip is formed on a section of the bearing housing cap delimiting the recess of the bearing housing cap, and the oil trapping lip is formed in a position in an axial direction adjacent to the section of the turbine cover projecting into the recess of the bearing housing cap, wherein the axial direction is defined by the shaft, and wherein the oil trapping is formed on a side of the bearing housing cap facing the turbine rotor.

2. The turbocharger according to claim 1, wherein the oil trapping lip is formed by a protrusion and a groove.

3. The turbocharger according to claim 2, wherein the protrusion of the oil trapping lip has a smaller clearance from the turbine rotor than the groove of the oil trapping lip.

4. The turbocharger according to claim 2, wherein the protrusion of the oil trapping lip extends, from a radially inside facing surface of the oil trapping lip at an oblique position relative to a radial direction in a direction of the turbine rotor.

5. The turbocharger according to claim 2, wherein the groove of the oil trapping lip is open to a radially inside direction and faces the section of the turbine cover.

6. The turbocharger according to claim 1, wherein on the section of the turbine cover projecting into the recess of the bearing housing cap an oil trapping slope is formed on the side facing the turbine rotor.

7. The turbocharger according to claim 6, wherein the oil trapping lip is disposed directly above the oil trapping slope in a radial direction with a clearance between the oil trapping lip and the oil trapping slope in the radial direction.

8. The turbocharger according to claim 7, wherein the oil trapping lip of the bearing housing cap directs oil onto the oil trapping slope of the turbine cover, and the oil trapping slope of the turbine cover directs the oil into a turbine flow duct.

* * * * *